(12) United States Patent
Boecker et al.

(10) Patent No.: US 12,254,129 B2
(45) Date of Patent: Mar. 18, 2025

(54) DETERMINING CHARGE ON A FACIAL-TRACKING SENSOR

(71) Applicant: Microsoft Technology Licensing, LLC, Redmond, WA (US)

(72) Inventors: Charles Walter Boecker, Ames, IA (US); Jouya Jadidian, Los Gatos, CA (US); Barry Thompson, Menlo Park, CA (US); Niranjan Achugundla Puttaswamy, San Jose, CA (US); Lawrence Albert Prather, Boulder Creek, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 196 days.

(21) Appl. No.: 17/809,520

(22) Filed: Jun. 28, 2022

(65) Prior Publication Data

US 2023/0418368 A1    Dec. 28, 2023

(51) Int. Cl.
*G06F 3/01* (2006.01)
*G01D 5/24* (2006.01)

(52) U.S. Cl.
CPC .............. *G06F 3/012* (2013.01); *G01D 5/24* (2013.01); *G06F 3/013* (2013.01)

(58) Field of Classification Search
CPC ........ G01R 27/00; G01R 27/02; G01R 27/26; G01R 27/2605; G01D 5/00; G01D 5/12; G01D 5/14; G01D 5/24; G06F 3/00; G06F 3/01; G06F 3/011; G06F 3/012; G06F 3/013

(Continued)

(56) References Cited

U.S. PATENT DOCUMENTS 8,665,177 B2 * 3/2014 Herrmann ............... G06F 1/163
        351/158
9,830,507 B2 * 11/2017 Vetek .................. G06V 40/176
(Continued)

FOREIGN PATENT DOCUMENTS

DE    102008044067 A1 *  5/2010  ........... H03K 17/955
WO         9113584 A1     9/1991

OTHER PUBLICATIONS

"International Search Report and Written Opinion Issued in PCT Application No. PCT/US2023/017536", Mailed Date: Jul. 13, 2023, 13 Pages.

*Primary Examiner* — Hoai-An D. Nguyen
(74) *Attorney, Agent, or Firm* — Alleman Hall & Tuttle LLP

(57) ABSTRACT

Examples are provided that relate to determining a capacitance based on a charge accumulated on a sense capacitor electrode. One example provides a head-mounted device comprising a facial-tracking sensor, a controller, and a charge sensing circuit connected to the facial-tracking sensor. The facial-tracking sensor includes a sense capacitor electrode configured to be positioned proximate to a surface of a face and form a capacitance based upon a distance between the sense capacitor electrode and the surface of the face, and the controller configured to apply a reference voltage to the sense capacitor electrode. The charge sensing circuit is configured to determine the capacitance of the sense capacitor electrode by determining an amount of charge accumulated on the sense capacitor electrode resulting from the reference voltage.

20 Claims, 7 Drawing Sheets

(58) Field of Classification Search
USPC .................................. 324/600, 649, 658, 661
See application file for complete search history.

(56) References Cited

U.S. PATENT DOCUMENTS

| | | | |
|---|---|---|---|
| 10,181,021 B2 * | 1/2019 | Venkatraman | G06F 21/32 |
| 10,697,839 B2 * | 6/2020 | Neel | H03K 17/955 |
| 10,754,054 B2 | 8/2020 | Aponte Luis | |
| 10,817,114 B2 * | 10/2020 | Sasai | G01R 27/26 |
| 2011/0221656 A1 | 9/2011 | Haddick et al. | |
| 2013/0154906 A1 | 6/2013 | Braun et al. | |
| 2015/0015847 A1 | 1/2015 | Bergman et al. | |
| 2016/0353988 A1 | 12/2016 | Moller et al. | |
| 2022/0043531 A1 | 2/2022 | Tang et al. | |

* cited by examiner

DETERMINING CHARGE ON A FACIAL-TRACKING SENSOR

BACKGROUND

A capacitive sensor may be used to track a proximity of an object to another object. For example, a head-mounted device may track facial expressions by tracking proximities of facial surfaces to capacitive sensors incorporated into the head-mounted device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to measuring a capacitance of a sense capacitor based upon a charge accumulated on an electrode of the sense capacitor. One example provides a head-mounted device comprising a facial-tracking sensor, a controller, and a charge sensing circuit connected to the facial-tracking sensor. The facial-tracking sensor comprises a sense capacitor electrode configured to be positioned proximate to a surface of a face and form a capacitance based upon a distance between the sense capacitor electrode and the surface of the face. The controller is configured to apply a reference voltage to the sense capacitor electrode. The charge sensing circuit is configured to determine the capacitance of the sense capacitor electrode by determining an amount of charge accumulated on the sense capacitor electrode resulting from the reference voltage.

DETAILED DESCRIPTION

As mentioned above, a head-mounted device may comprise facial-tracking sensors to track facial movements. One possible method to perform facial tracking is to measure capacitance values using an array of facial-tracking sensors located on the head-mounted device. For example, as the face muscles move, the capacitances of the facial-tracking sensors may change based upon proximities of facial surfaces to corresponding sensors.

One possible method of determining capacitance is to use a resonant LC circuit incorporating a sense capacitor of a facial-tracking sensor. Changes in facial proximity to the sense capacitor may lead to measurable changes in resonant frequency of the resonant LC circuit. However, capacitive crosstalk may occur between facial-tracking sensors on the array, which may complicate concurrently performing capacitance measurements for multiple sensors.

Accordingly, examples are disclosed that relate to determining a capacitance of a sense capacitor of a facial-tracking sensor by determining an amount of charge stored on an electrode of the sense capacitor. Briefly, a facial-tracking sensor comprises a sense capacitor electrode configured to be positioned proximate to a surface of a face. The sense capacitor electrode forms a capacitance based upon a distance between the sense capacitor electrode and the surface of the face. A controller applies a reference voltage to the sense capacitor electrode of the facial-tracking sensor. Then a charge sensing circuit determines the capacitance on the sense capacitor electrode by determining an amount of charge accumulated on the sense capacitor electrode resulting from application of the reference voltage. In some examples, the controller also applies the reference voltage to a shielding track along electrical connections between the charge sensing circuit and the facial-tracking sensor. The reference voltage on the shielding track may help to reduce capacitive crosstalk received on the facial-tracking sensor. These and other examples are described in more detail below.

Figure 1:
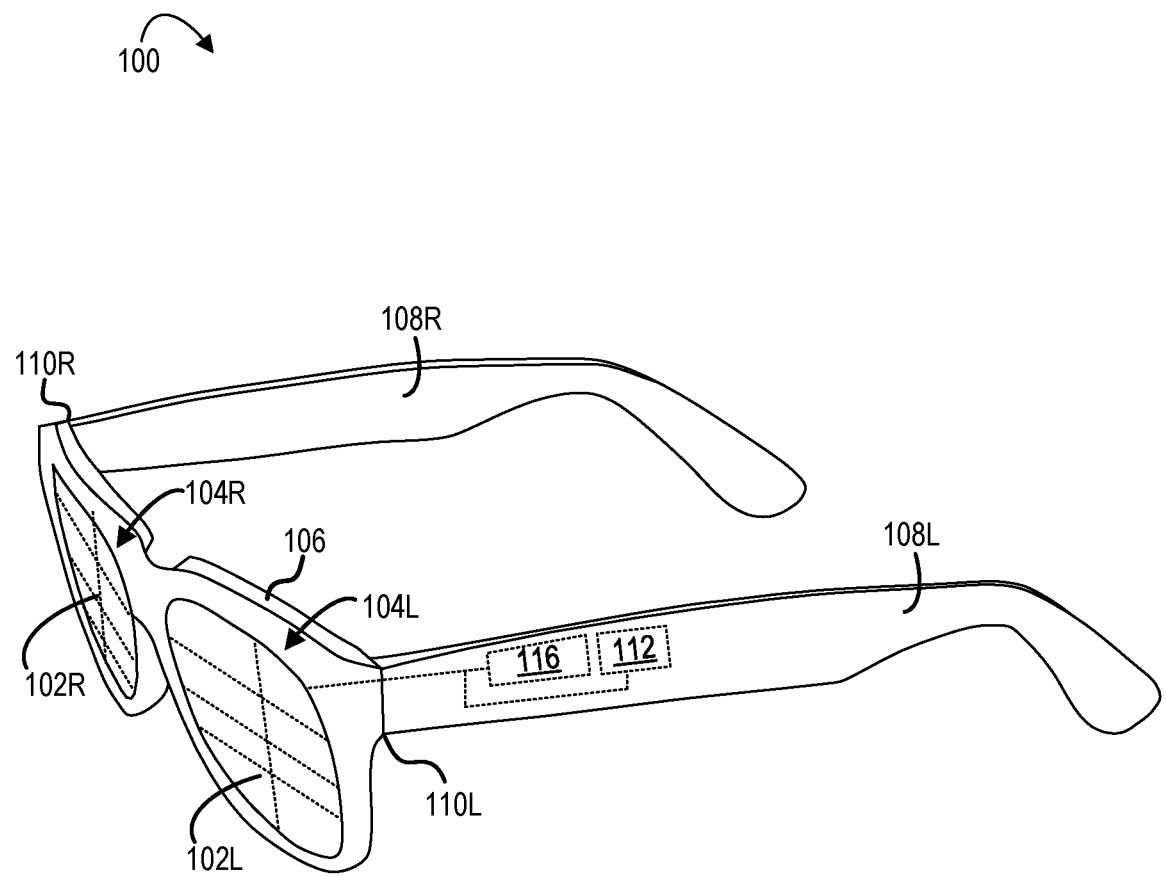
FIG. 1 shows an example head-mounted device.

FIG. 1 shows an example head-mounted device 100 that includes a plurality of facial-tracking sensors. More particularly, the head-mounted device 100 comprises a left sense capacitor electrode array 102L formed on a left lens 104L of head-mounted device 100, and a right sense capacitor electrode array 102R formed on a right lens 104R of head-mounted device 100. Each of left sense capacitor electrode array 102L and the right sense capacitor electrode array 102R comprises a plurality of sense capacitor electrodes each configured to sense a different region of a wearer's face. Each sense capacitor electrode is configured to be positioned proximate to a surface of a face and form a capacitance based upon a distance between the sense capacitor electrode and the surface of the face. In other examples, a head-mounted device alternatively or additionally may comprise one or more sense capacitor electrodes disposed on a frame 106 of the head-mounted device 100.

Left lens 104L and right lens 104R are supported by a frame 106, which is connected to side frames 108L, 108R via optional hinge joints 110L, 110R Left sense capacitor electrode array 102L and right sense capacitor electrode array 102R are respectively schematically depicted by dashed lines on left lens 104L and right lens 104R, which indicate an arbitrary spatial arrangement of electrodes. Example sense electrode array layouts are discussed in more detail below. The term "lens" is used herein to represent one or more optical components through which a real-world environment can be viewed. The term "lens" may comprise an optical combiner that combines virtual and real imagery, and/or one or more transparent optical components other than a combiner, such as a separate lens with or without optical power.

Each lens 104L, 104R comprises an electrically insulating substrate that is at least partially optically transparent. For example, the substrate may comprise a glass, or an optically transparent plastic such as polycarbonate, polymethyl methacrylate (PMMA), polystyrene, polyethylene terephthalate (PET), cyclic olefin polymer, or other suitable material.

Sense capacitor electrode arrays 102L, 102R are formed from electrically conductive films that are at least partially optically transparent. The films may comprise one or more electrically conductive materials, such as indium tin oxide (ITO), silver nanowires, silver nanoparticles, carbon nanotubes, graphene, a mixture of two or more such materials (e.g., silver nanoparticle-ITO hybrid), and/or other suitable material(s). The film(s) may be formed via any suitable process, such as chemical vapor deposition, sputtering, atomic layer deposition, evaporation, or liquid phase application (e.g. spin-on, dip-coating, application by doctor-blade, etc.). Trenches formed between the sense capacitor electrodes may be utilized for placement of conductive traces. As the conductive film may not be fully optically transparent in some examples, the use of relatively thinner films for the sense capacitor electrodes may provide for greater transparency compared to relatively thicker coatings.

Head-mounted device 100 further comprises a plurality of charge sensing circuits, schematically illustrated at 112. Each charge sensing circuit of the plurality of charge sensing circuits 112 is connected to a corresponding facial-tracking sensor. Each charge sensing circuit 112 is configured to determine the capacitance of a corresponding sense capacitor electrode by determining an amount of charge accumulated on the corresponding sense capacitor electrode resulting from application of a reference voltage, as discussed below.

In some examples, head-mounted device 100 further may include an image producing system (for example a laser scanner, a liquid crystal on silicon (LCoS) microdisplay, a transmissive liquid crystal microdisplay, an organic light emitting device (OLED) microdisplay, or digital micromirror device (DMD)) to produce images for display. Images displayed via left-eye and right-eye transparent combiners may comprise stereo images of virtual objects overlayed on the real-world scene such that the virtual objects appear to be present in the real-world scene.

Head-mounted device 100 further comprises a controller 116. Controller 116 comprises, among other components, a logic subsystem and a storage subsystem that stores instructions executable by the logic subsystem to control the various functions of head-mounted device 100, including but not limited to the facial-tracking functions described herein.

Figure 2:
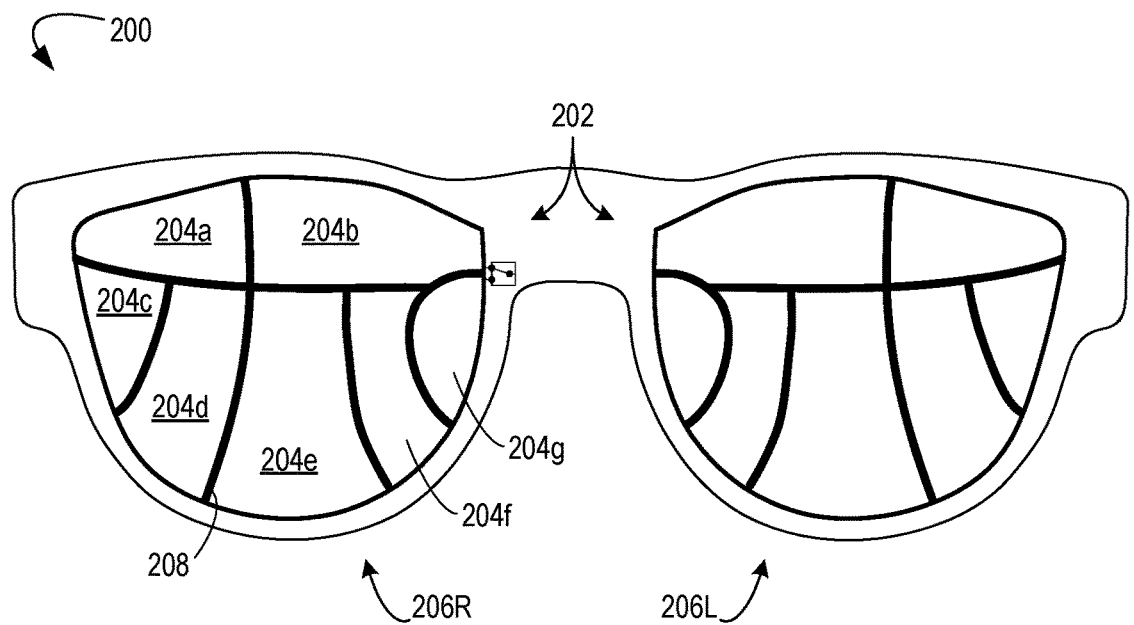
FIG. 2 shows an example layout of sense capacitor electrodes for a head-mounted device.

FIG. 2 shows a front view of an example head-mounted device 200 illustrating an example layout 202 of a sense capacitor electrode array comprising a plurality of sense capacitor electrodes. Head-mounted device 200 is an example implementation of head-mounted device 100. Head-mounted device 200 includes a right lens 206R and a left lens 206L for right and left eyes, respectively. Layout 202 comprises seven sense capacitor electrodes formed on each of right lens 206R and left lens 206L. While the example depicted comprises seven sense capacitor electrodes per lens, in other examples, any other suitable layout comprising any suitable number of sense capacitance electrodes may be used.

As shown on lens 206R, sense capacitor electrodes 204a-g are separated by trench regions 208, indicated by thick dark lines. Trench regions 208 are regions between sense capacitor electrodes that lack the electrically conductive film(s) that form sense capacitor electrodes 204a-g. In some examples, trench regions 208 may comprise electrically conductive traces to connect sense capacitor electrodes 204a-g to charge sensing circuits (not shown) and/or other circuitry. Trench regions 208 may be formed by masking followed by deposition of the conductive film for the sense capacitor electrodes, or by etching after forming the conductive film, in various examples. In some examples, trench regions are etched into the lens or other substrate.

As a conductive film from which the sense capacitor electrode arrays are formed may not be fully transparent, layout 202 may be visible in some examples. However, when incorporated into a device configured to be worn on the head, layout 202 may be positioned closer than a focal length of the human eye during most normal use of head-mounted device 200. As such, layout 202 may be out of focus to a user during ordinary device use, and thus may not obstruct the user's view or distract the user.

Figure 3:
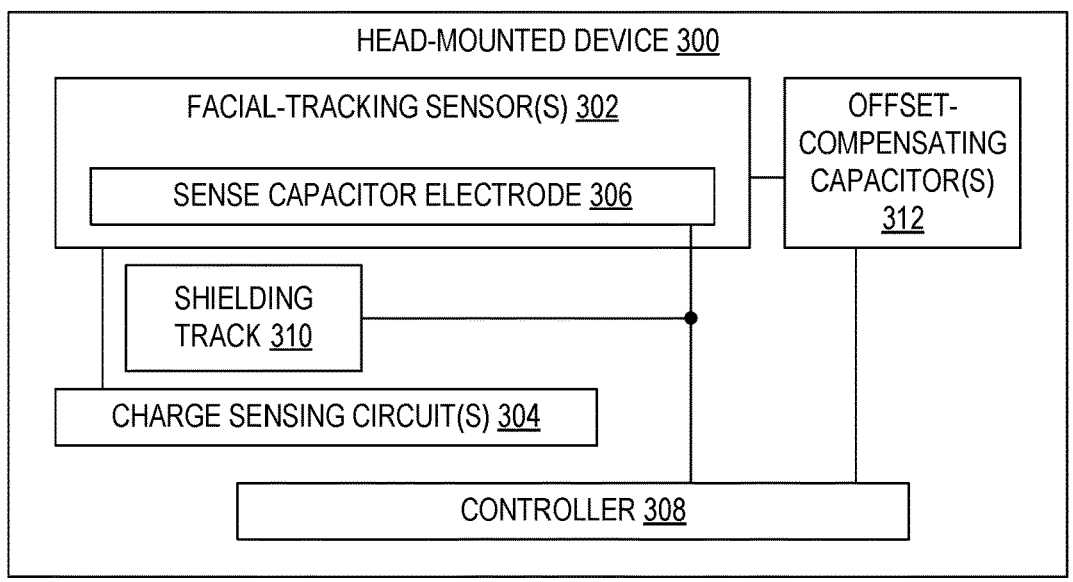
FIG. 3 shows a block diagram of an example head-mounted device.

FIG. 3 shows a block diagram of an example head-mounted device 300. Head-mounted devices 100 and 200 are examples of head-mounted device 300. Head-mounted device 300 comprises one or more facial-tracking sensors 302, and a corresponding one or more charge sensing circuits 304. Each facial-tracking sensor 302 comprises a sense capacitor electrode 306 configured to be positioned proximate to a surface of a face and form a capacitance based upon a distance between sense capacitor electrode 306 and the surface of the face. Each charge sensing circuit is connected to a corresponding facial-tracking sensor 302. In some examples, sense capacitor electrodes 306 of the one or more facial-tracking sensors 302 may be located on one or more lenses of head-mounted device 300 as described above. Alternatively or additionally, in some examples, sense capacitor electrodes 306 of the one or more facial-tracking sensors 302 may be located on a frame of head-mounted device 300 or any other suitable location.

Head-mounted device 300 further comprises a controller 308 configured to apply a reference voltage to sense capacitor electrodes 306 of the one or more facial-tracking sensors 302. As mentioned above, each charge sensing circuit 304 is configured to determine the capacitance of sense capacitor electrode 306 of the corresponding facial-tracking sensor 302 by determining an amount of charge accumulated on sense capacitor electrode 306 resulting from the reference voltage. For example, the capacitance, C, may be determined by using Q=C*V, where V is the reference voltage and Q is the amount of charge accumulated on sense capacitor electrode 306 resulting from the reference voltage. In some examples, each charge sensing circuit 304 is further configured to generate a plurality of capacitance bit values based at least on oversampling the amount of charge accumulated on sense capacitor electrode 306 of the corresponding facial-tracking sensor 302 resulting from the reference voltage. Oversampling comprises performing repeated samplings of the charge on sensor capacitor electrode 306, and filtering the repeated samplings. As one illustrative example, oversampling may comprise sampling the charge accumulated 256 consecutive times, and determining a capacitance value (16 bit values in some examples) based on the 256 samples. Such a configuration may help to increase an accuracy of a charge sample determined from sense capacitor electrode 306 compared to not oversampling the charge accumulated. In other examples, a greater or lesser number of samples may be acquired. In some examples, the capacitance bit values may be used by downstream digital processing, such as for controlling computer-generated facial animation. In other examples, charge sensing circuit 304 can generate any other suitable output for any other suitable use.

In various examples, charge sensing circuit 304 may comprise a sigma-delta analog-digital converter (SD-ADC), successive approximation ADC, dual slope ADC, flash ADC, pipelined ADC, and/or any other suitable ADC circuitry. In some examples, charge accumulated on each of a plurality of sense capacitor electrodes 306 may be determined concurrently. As such, controller 308 may be configured to concurrently operate the corresponding one or more of charge sensing circuits 304. Such a configuration may help to enable faster operation than a configuration that utilizes time-multiplexed operation of facial-tracking sensors.

Head-mounted device 300 further comprises a shielding track 310 along electrical connections between the one or more charge sensing circuits 304 and the corresponding one or more facial-tracking sensors 302. Shielding track 310 may help to reduce electrical interference from conductors near the electrical connections between the one or more facial-tracking sensors 302 and the corresponding one or more charge sensing circuits 304, such as capacitive crosstalk between sense capacitor electrodes 306. Reducing capacitive crosstalk may help to lessen sensing errors and/or reduce noise. For example, shielding track 310 may help to electrically cancel stray capacitance between an electrical ground of head-mounted device 300 (e.g., a frame of head-mounted device 300) and the electrical connections. In some examples, a signal to noise ratio may increase the farther shielding track 310 extends along a distance of the electrical connections. Benefits of extending a distance of a shielding track may be balanced with an increase in power, weight, and/or mechanical design complexity of a head-mounted device that may result from a longer shielding track. Controller 308 is further configured to apply the reference voltage to the shielding track 310. When controller 308 concurrently applies the reference voltage to shielding track 310 and sense capacitor electrodes 306 of the corresponding plurality of facial-tracking sensors 302, capacitive crosstalk between sense capacitor electrodes 306 may be electrically canceled. The electrical connections between the one or more facial-tracking sensors 302 and the corresponding one or more charge sensing circuits 304 may comprise flex cables, coaxial cables, printed traces, and/or any other suitable electrical connections.

In some examples, one or more facial-tracking sensors 302 may electrically see an offset capacitance (not shown in FIG. 3). In some such examples, another capacitor may be used electrically cancel the offset capacitance. As such, in some examples, head-mounted device 300 further comprises a corresponding one or more offset-compensating capacitors 312 connected to the corresponding one or more facial-tracking sensors 302. In some examples, each offset-compensating capacitor 312 may comprise a fixed capacitor with a smaller capacitance than the offset capacitance. In such examples, controller 308 may be configured to, for each fixed capacitor, toggle a connection of the fixed capacitor to electrically cancel the offset capacitance on sense capacitor electrode 306 of corresponding facial-tracking sensor 302, as discussed below. In other examples, each offset-compensating capacitor 312 can comprise a programmable capacitor selectively controllable to adjust a capacitance value. In some such examples, the programmable capacitor may be toggled once, but a capacitance of the programmable capacitor may be adjusted to match the offset capacitance. In yet other examples, corresponding one or more offset-compensating capacitors 312 may comprise any other suitable capacitance, or may be omitted.

Figure 4:
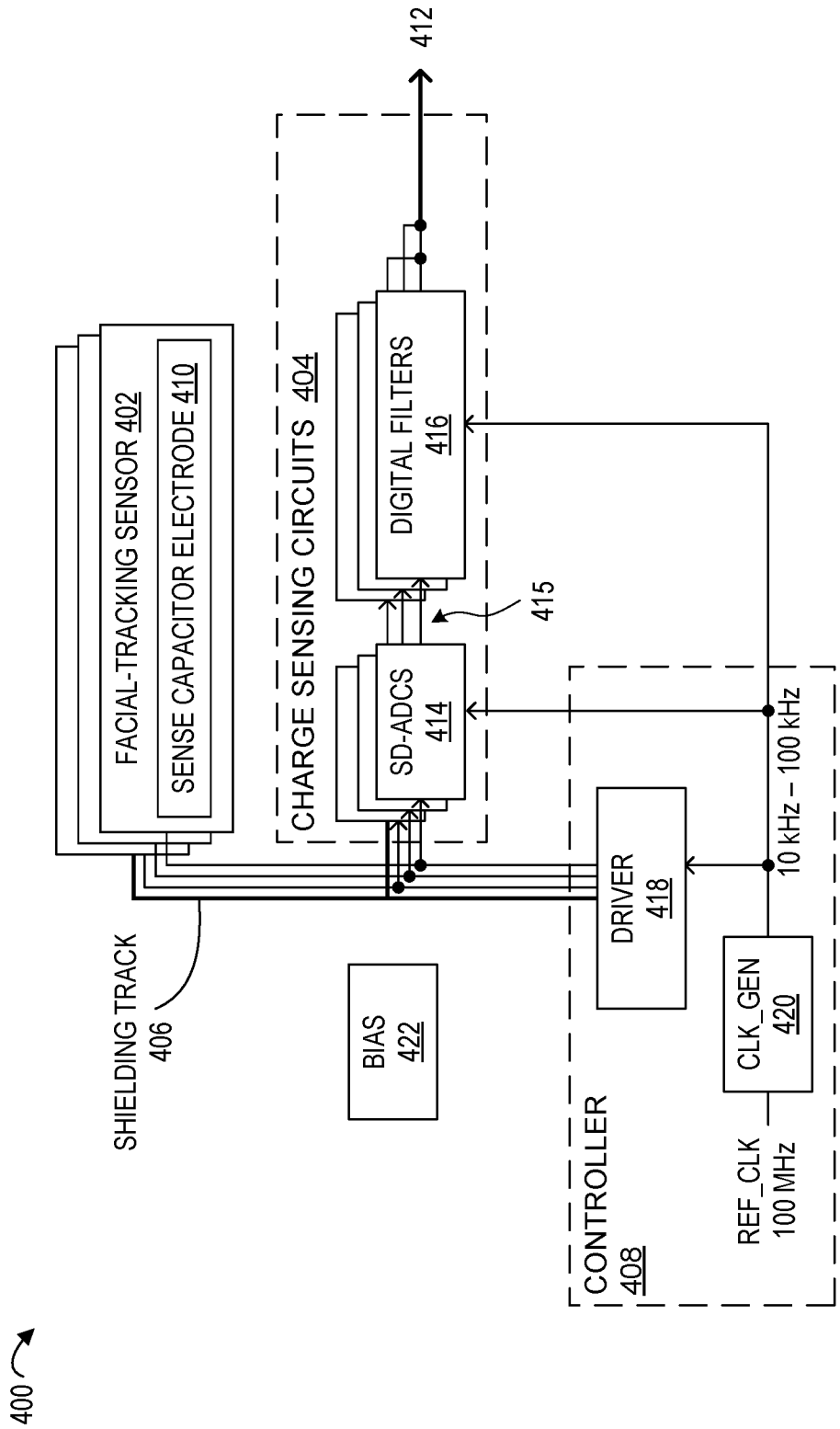
FIG. 4 depicts a more detailed block diagram of an example head-mounted device.

FIG. 4 depicts a more detailed block diagram of an example head-mounted device 400. Head-mounted device 400 is an example implementation of head-mounted device 300. Similar to head-mounted device 300, head-mounted device 400 comprises a plurality of facial-tracking sensors 402, a corresponding plurality of charge sensing circuits 404, a shielding track 406, and a controller 408. Similar to facial-tracking sensor 302, each facial-tracking sensor of the plurality of facial-tracking sensors 402 comprises a sense capacitor electrode 410. In the depicted example, each charge sensing circuit 404 is configured to generate a plurality of capacitance bit values 412 based at least on oversampling the amount of charge accumulated. Each charge sensing circuit 404 comprises a SD-ADC 414 and a digital filter 416 connected to an output of SD-ADC 414. By way of an example, SD-ADC 414 oversamples an input of charge sensing circuit 404 and outputs a bit stream 415 indicating the amount of charge accumulated based at least on oversampling the input. In some examples, the oversampling may comprise an oversampling ratio in a range of 50 to 256. In other examples, the oversampling may comprise any other suitable oversampling ratio. Oversampling the input may help to increase a precision of SD-ADC 414, allow noise shaping of an analog-digital conversion, and/or reduce design complexity of SD-ADC 414. As an example, the noise shaping may shape the noise to a higher frequency, and thus may facilitate filtering of the noise. In some examples, SD-ADC 414 may comprise a second order SD-ADC. Such a configuration, for a given sample frequency, may enable reducing an oversampling ratio and increasing the number of samples after oversampling. Thus, a frame rate may be increased, or a starting sampling frequency may be reduced, which may help to reduce power. As a specific example, for a 16-bit output of an SD-ADC comprising around 100 dB (decibels) of a signal to noise ratio, a first order SD-ADC may have an oversampling ratio of 1024, while a second order SD-ADC may have an oversampling ratio of 256.

Digital filter 416 converts bit stream 415 from SD-ADC 414 to plurality of capacitance bit values 412 and filters high-frequency noise from the plurality of capacitance bit values 412. Such noise filtering may help to increase a signal to noise ratio. In examples where SD-ADC 414 comprises a second order SD-ADC, digital filter 416 comprises a second order filter. In other examples, each SD-ADC 414 and each digital filter 416 may comprise any suitable order of SD-ADC and digital filter, respectively. Charge sensing circuit 404 is illustrative, and any suitable circuitry may be used to determine the capacitance of sense capacitor electrode 410 by determining an amount of charge accumulated on sense capacitor electrode 410 resulting from the reference voltage.

The depicted controller 408 comprises a driver circuit 418 and a clk_gen circuit 420. Driver circuit 418 is configured to generate and concurrently apply the reference voltage to shielding track 406 and sense capacitor electrodes 410 of plurality of facial-tracking sensors 402. Concurrently applying the reference voltage may help to enable a concurrent operation of plurality of charge sensing circuits 404. Clk_gen circuit 420 is configured to generate a lower frequency clock from a reference clock. In some examples, the lower frequency clock may comprise a clock frequency in the range of 10 kHz (kilohertz) to 100 kHz in some examples, or a clock frequency outside of this range in other examples. The lower frequency clock may help to enable a time period to charge sense capacitor electrode 410 to the reference voltage before determining the capacitance value on sense capacitor electrode 410. Clk_gen circuit 420 may comprise a clock divider, and/or any other suitable clock circuitry. The lower frequency clock may help to control one or more operations of driver circuit 418 and/or plurality of charge sensing circuits 404, such as concurrently operating the plurality of charge sensing circuits 404. In some examples, clk_gen circuit 420 may generate a plurality of non-overlapping lower frequency clock signals. The non-overlapping lower frequency clocks may be used for different phases of operation of SD-ADC 414, as discussed below. Controller 408 is illustrative, and any other suitable control circuitry may be used in other examples.

Head-mounted device 400 further comprises a bias circuit 422. In the depicted example, bias circuit 422 may generate various bias supplies used by clk_gen circuit 420, SD-ADC 414, and/or other components of head-mounted device 400. In other examples, bias circuit 422 may be omitted.

Figure 5:
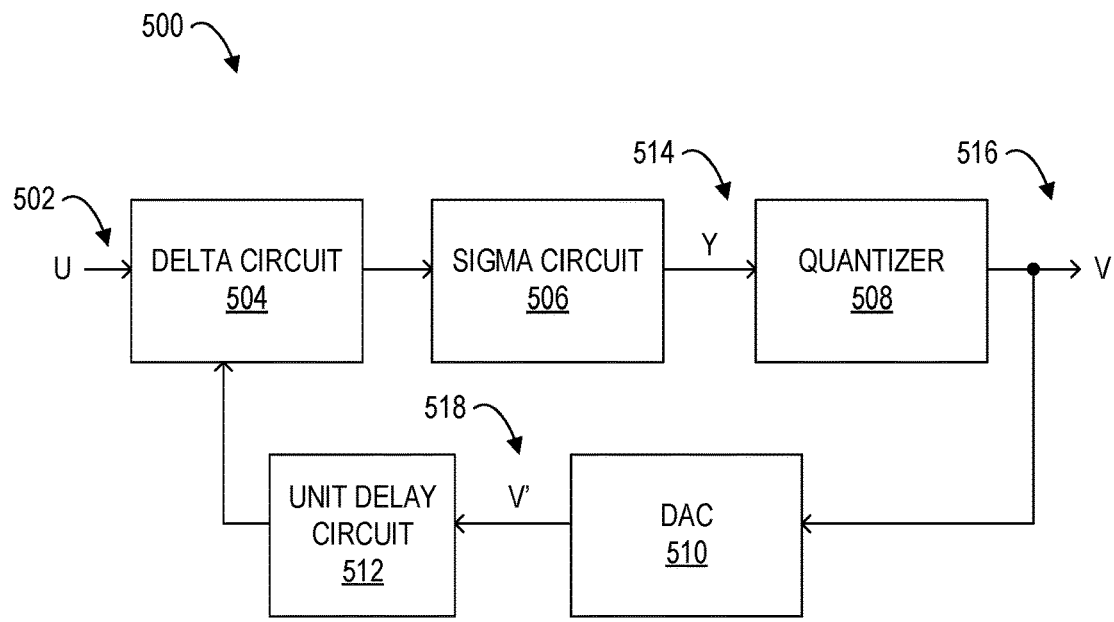
FIG. 5 shows a block diagram of an example delta-sigma analog-digital converter.

FIG. 5 depicts a block diagram of an example SD-ADC 500. SD-ADC 500 is an example implementation of SD-ADC 414. SD-ADC 500 receives an analog input U 502 and outputs a digital output V via a delta circuit 504, a sigma circuit 506, and a quantizer 508. SD-ADC 500 further comprises a feedback path comprising a digital-analog converter (DAC) 510 and a unit delay circuit 512. Delta circuit 504 compares a difference between input U 502 and an output of the feedback path. For example, delta circuit 504 may compare a difference in analog voltage between input U 502 and the output of the feedback path. Next, sigma circuit 506 is configured to output node Y 514 based at least on an average of an output of delta circuit 504 over time. The average over time may be determined over continuous time or discrete time (e.g., on a clock cycle). Sigma circuit 506 may comprise an integrator circuit, as discussed below, and/or any other suitable circuitry. Continuing, quantizer 508 samples node Y 514 and outputs a digital value based on a sampled value of node Y 514 forming a bit stream 516. As a specific example, quantizer 508 may comprise a comparator circuit configured to output, on a clock cycle, a logical 0 or a logical 1 when node Y 514 is below a quantizer reference voltage or above a quantizer reference voltage, respectively.

DAC 510 converts bit stream 516 into an analog domain, such as an analog voltage, for example. Next, unit delay circuit 512 delays feedback voltage V' 518 for one cycle. In such a manner, feedback voltage V' 518 is added to a next sample. Such a configuration may help to shape noise on feedback voltage V' 518 (e.g., quantization noise resulting from quantizer 508) and move a majority of the noise to higher frequencies. Reshaping the noise can help to remove the noise from the system, such as using an analog filter and/or a digital filter to filter the higher frequencies, as examples. Further, the feedback path can help to generate dither on delta circuit 504, which may help to increase a performance of SD-ADC 500. In other examples, unit delay circuit 512 may be configured to delay a feedback voltage for any suitable number of cycles. FIG. 5 is an example SD-ADC, and SD-ADC 500 may comprise any suitable circuitry.

Figure 6:
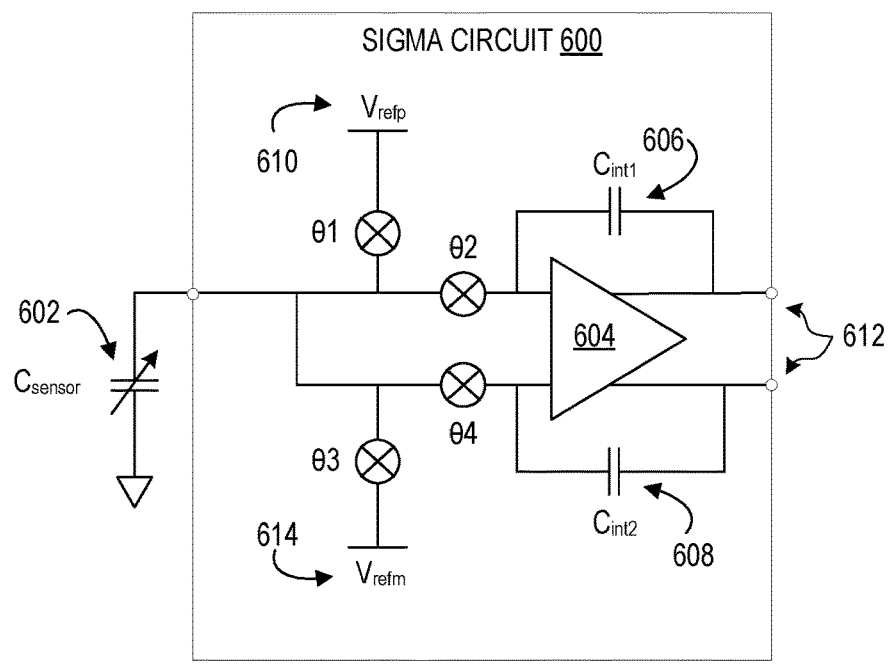
FIG. 6 shows a schematic view of an example sigma circuit.

FIG. 6 shows a schematic diagram of an example sigma circuit 600 connected to a sense capacitor electrode 602. Sigma circuit 600 can be used by SD-ADC 414 and SD-ADC 500 for example. Sigma circuit 600 comprises an integrator 604 with a first integrator capacitor 606 and a second integrator capacitor 608. Operation of sigma circuit 600 is controlled via a first control point $\theta 1$, a second control point $\theta 2$, a third control point $\theta 3$, and a fourth control point $\theta 4$. In some examples, a controller outside of sigma circuit 600 (e.g. controller 408) may control the first, second, third and fourth control points.

A first reference voltage 610 is connected to sense capacitor electrode 602 when first control point $\theta 1$ conducts. As such, first reference voltage 610 is applied to sense capacitor electrode 602. Then, first control point $\theta 1$ opens and second control point $\theta 2$ conducts, which transfers charge accumulated on sense capacitor electrode 602 resulting from the reference voltage to first integrator capacitor 606. First integrator capacitor 606 and integrator 604 output a voltage based on the charge accumulated. In other examples, when first control point $\theta 1$ opens, second control point $\theta 2$ and fourth control point $\theta 4$ conducts and the charge accumulated on sense capacitor electrode 602 is transferred to first integrator capacitor 606 and second integrator capacitor 608. In such a configuration, integrator 604 is considered fully differential, and the charge accumulated is split between first and second integrator capacitors 606, 608. Therefore, an output voltage is split between output nodes of integrator 604, as indicated at 612. A fully differential integrator may help to increase a precision of a SD-ADC, reduce susceptibility to stray noise and or coupling, and/or reduce a design complexity of the SD-ADC.

Continuing, when third control point $\theta 3$ conducts, a second reference voltage 614 is connected and applied to sense capacitor electrode 602. In the depicted example, applying first reference voltage 610 directs the charge accumulated on sense capacitor electrode 602 to a non-inverting input of integrator 604 in a first cycle, and applying second reference voltage 614 directs the charge accumulated on sense capacitor electrode 602 to an inverting input of integrator 604 in a second cycle. In a similar manner as above, then third control point $\theta 3$ opens and fourth control point $\theta 4$ conducts, which transfers the charge accumulated on sense capacitor electrode 602 to second integrator capacitor 608. Second integrator capacitor 608 and integrator 604 then output a voltage based on the charge accumulated. In other examples, first, second, third, and fourth control points may be controlled in any other suitable manner. FIG. 6 is illustrative, and any other suitable circuitry may be used in other examples.

Figure 7:
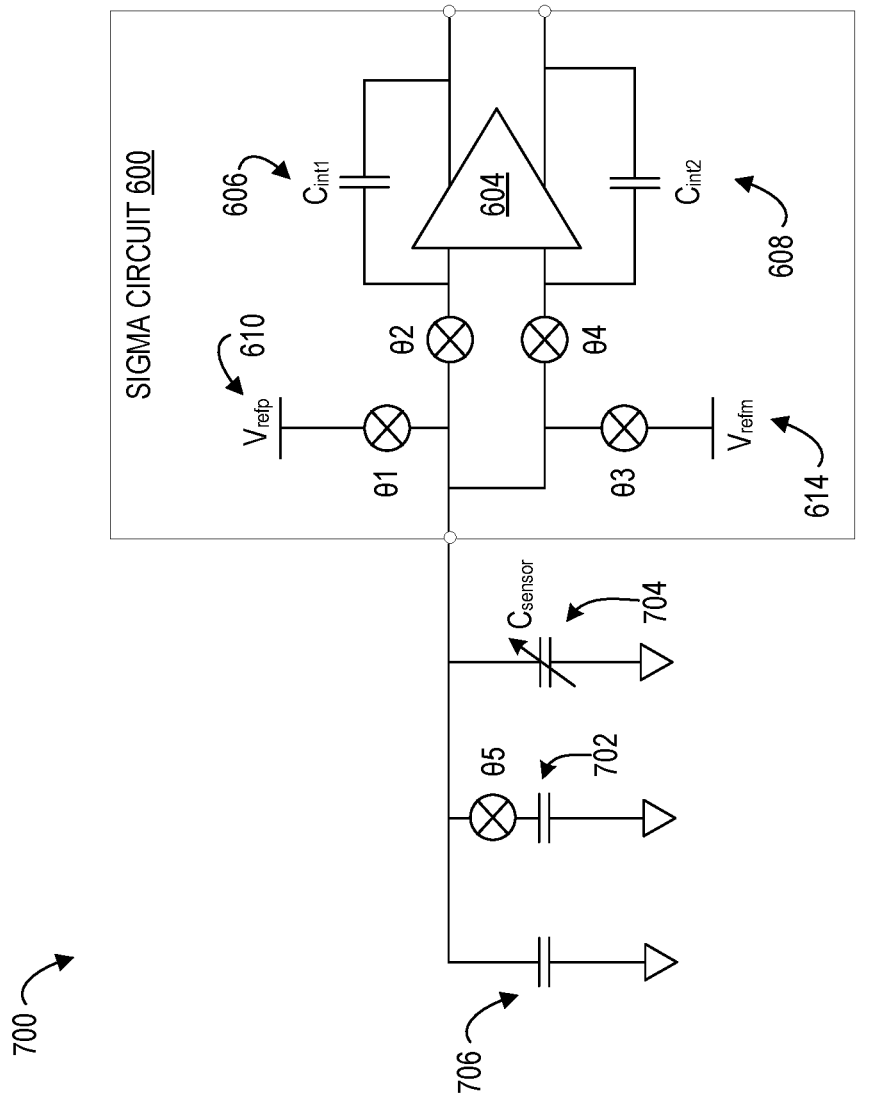
FIG. 7 shows a schematic view of another sigma circuit utilizing a fixed capacitor to electrically cancel an offset capacitance.

In some examples, one or more facial-tracking sensors on a device may electrically see an offset capacitance larger than capacitance to a proximate point on a face, which may interfere with sensing smaller capacitances to the face (e.g., the offset capacitance may be larger than a sensor range). In some examples, such offset capacitance may be electrically canceled by using a capacitor configured with a similar or equivalent capacitance value as the offset capacitance. However, larger capacitors may consume a larger area. Accordingly, FIG. 7 shows an example head-mounted device 700 that utilizes a relatively smaller fixed capacitor 702 connectable to a sense capacitor electrode 704 to electrically cancel an offset capacitance 706. In the depicted example and as discussed above, first control point $\theta 1$ conducts and first reference voltage 610 is applied to sense capacitor electrode 704. Then first control point $\theta 1$ opens and fifth control point $\theta 5$, located on a connection of fixed capacitor 702, toggles to electrically cancel offset capacitance 706 on sense capacitor electrode 704. The number of toggles may be based on a capacitance value of fixed capacitor 702 and a value of offset capacitance 706. For example, when offset capacitance 706 is 10 times larger than fixed capacitor 702, then fifth control point $\theta 5$ may toggle 10 times to electrically cancel offset capacitance 706. The use of toggling of fifth control point $\theta 5$ may help to reduce a size of fixed capacitor 702 on head-mounted device 700 compared to implementations where such toggling is omitted. While FIG. 7 depicts a single sense capacitor electrode, fixed capacitor, and sigma circuit, other examples can comprise a plurality of sense capacitor electrodes, and a corresponding plurality of fixed capacitors and sigma circuits.

Figure 8:
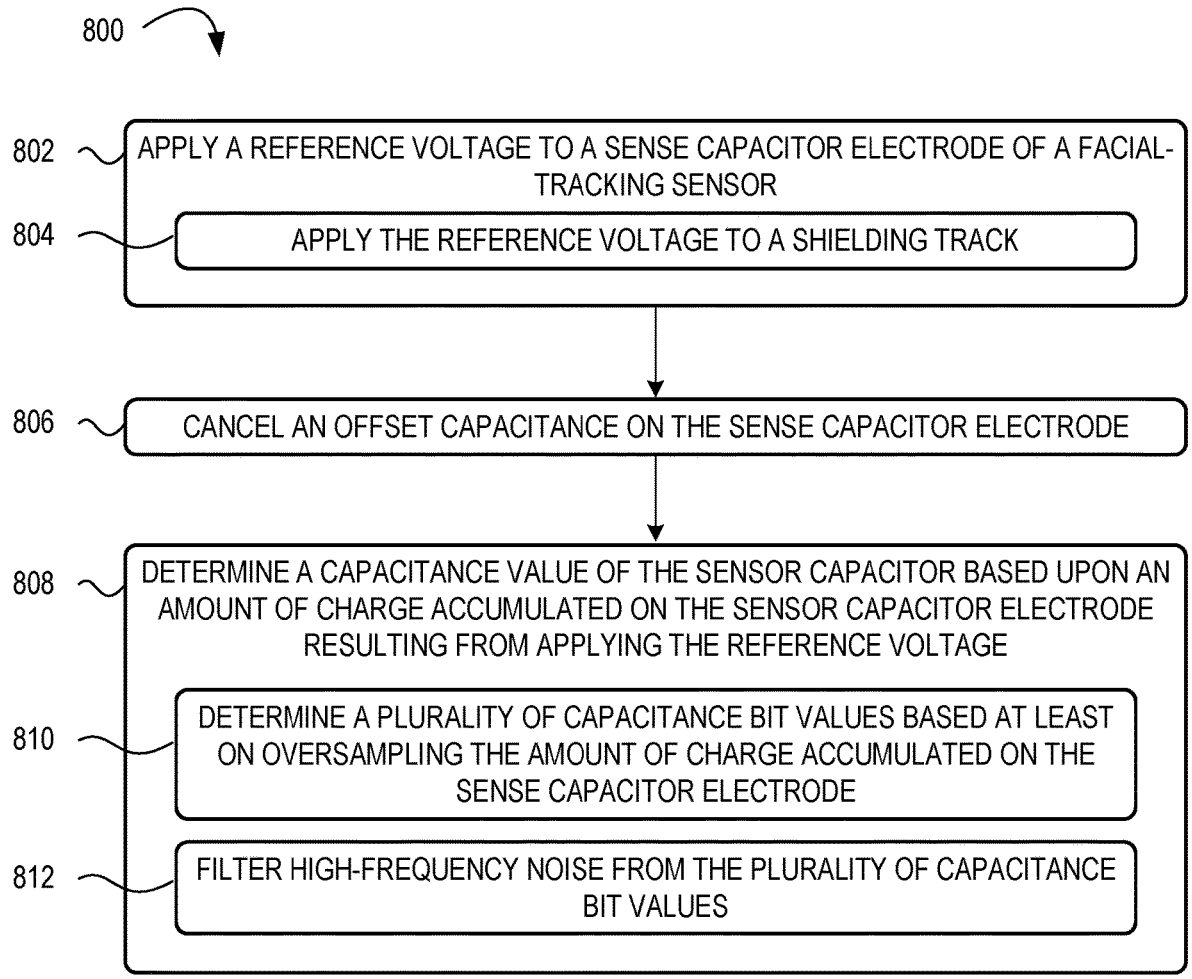
FIG. 8 shows a flow diagram of an example method for determining capacitance on a sense capacitor electrode.

FIG. 8 depicts a flow diagram of an example method 800 of determining a capacitance value on a sense capacitor electrode. Method 800 may be performed on a head-mounted device comprising a facial-tracking sensor and a charge sensing circuit, such as head-mounted device 100, head-mounted device 200, head-mounted device 300, head-mounted device 400, and head-mounted device 700, as examples. Method 800 comprises, at 802, applying a reference voltage to a sense capacitor electrode of the facial-tracking sensor. In some examples, method 800 comprises, at 804, applying the reference voltage to a shielding track along an electrical connection between the facial-tracking sensor and the charge sensing circuit. Applying the reference voltage to the shielding track may help to electrically cancel out capacitance between sense capacitor electrodes of a plurality of facial-tracking sensors on the head-mounted device. Further, applying the reference voltage to the shielding track may help to enable concurrently operating a corresponding plurality of charge sensing circuits. As mentioned above, in some examples, the head-mounted device may see an offset capacitance on the sense capacitor electrode. In some such examples, method 800 may comprise, at 806, cancelling an offset capacitance on the sense capacitor electrode by discharging the offset capacitance via toggling a connection of an offset-compensating capacitor. In some examples, the offset-compensating capacitor may comprise a smaller fixed capacitor which may be toggled multiple times. In such a manner, a smaller fixed capacitor may electrically cancel a larger offset capacitance. In other examples, the offset-compensating capacitor may comprise a programmable capacitor selectively controllable to adjust a capacitance value.

Continuing, method 800 comprises, at 808, determining a capacitance value of the sense capacitor electrode of the facial-tracking sensor based upon an amount of charge accumulated on the sense capacitor electrode of the facial-tracking sensor resulting from applying the reference voltage. In some examples, determining the capacitance value of the sense capacitor electrode comprises determining a plurality of capacitance bit values based at least on oversampling the amount of charge accumulated on the sense capacitor electrode of the facial-tracking sensor, as indicated at 810. As an example, the plurality of capacitance bit values may comprise a binary number indicating the amount of charge accumulated on the sense capacitor electrode. As previously mentioned, a SD-ADC may shape noise on the plurality of capacitance bit values to a higher frequency. Thus, in such examples, method 800 comprises, at 812, filtering high-frequency noise from the plurality of capacitance bit values. Filtering the high-frequency noise may help to increase a signal to noise ratio on the capacitance bit values. While method 800 is described in the context of one sense capacitor electrode, in examples where the head-mounted device comprises a plurality of sense capacitor electrodes and a corresponding plurality of charge sensing circuits, one or more steps of method 800 may be applied to each of a plurality of sense capacitor electrodes and a corresponding one or more charge sensing circuits.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
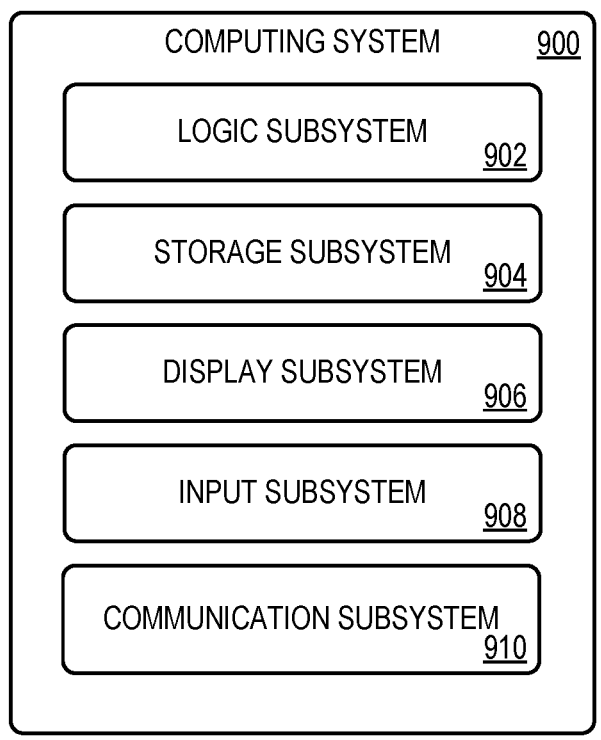
FIG. 9 shows a block diagram of an example computing system.

FIG. 9 schematically shows a non-limiting embodiment of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices.

Computing system 900 includes a logic subsystem 902 and a storage subsystem 904. Computing system 900 may optionally include a display subsystem 906, input subsystem 908, communication subsystem 910, and/or other components not shown in FIG. 9.

Logic subsystem 902 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage subsystem 904 includes one or more physical devices configured to hold instructions executable by the logic machine to implement the methods and processes described herein. When such methods and processes are implemented, the state of storage subsystem 904 may be transformed—e.g., to hold different data.

Storage subsystem 904 may include removable and/or built-in devices. Storage subsystem 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 902 and storage subsystem 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage subsystem 904. This visual representation may take the form of a graphical user interface (GUI). As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic subsystem 902 and/or storage subsystem 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices via a network such as the Internet.

Another example provides a head-mounted device, comprising, a facial-tracking sensor comprising a sense capacitor electrode configured to be positioned proximate to a surface of a face and form a capacitance based upon a distance between the sense capacitor electrode and the surface of the face, a controller configured to apply a reference voltage to the sense capacitor electrode, and a charge sensing circuit connected to the facial-tracking sensor and configured to determine the capacitance of the sense capacitor electrode by determining an amount of charge accumulated on the sense capacitor electrode resulting from the reference voltage. In some such examples, the device alternatively or additionally comprises a shielding track along an electrical connection between the charge sensing circuit and the facial-tracking sensor, and the controller is alternatively or additionally configured to apply the reference voltage to the shielding track. In some such examples, the charge sensing circuit is alternatively or additionally configured to generate a plurality of capacitance bit values based at least on oversampling the amount of charge accumulated. In some such examples, the charge sensing circuit is alternatively or additionally configured to filter high-frequency noise from the plurality of capacitance bit values. In some such examples, the charge sensing circuit alternatively or additionally comprises a sigma-delta analog-digital converter and a digital filter connected to an output of the sigma-delta analog-digital converter. In some such examples, the device alternatively or additionally comprises an offset-compensating capacitor, and the controller is alternatively or additionally configured to toggle a connection of the offset-compensating capacitor to electrically cancel an offset capacitance on the sense capacitor electrode. In some such examples, the offset-compensating capacitor alternatively or additionally comprises a programmable capacitor. In some such examples, the facial-tracking sensor is a first facial-tracking sensor, the charge sensing circuit is a first charge sensing circuit, the device alternatively or additionally comprises a second facial-tracking sensor and a second charge sensing circuit connected to the second facial-tracking sensor, and the controller is alternatively or additionally configured to concurrently apply the reference voltage to the sense capacitor electrode of the first facial-tracking sensor and a sense capacitor electrode of the second facial-tracking sensor, and concurrently operate the first charge sensing circuit and the second charge sensing circuit.

Another example provides, on a head-mounted device comprising a facial-tracking sensor and a charge sensing circuit, a method comprising, applying a reference voltage to a sense capacitor electrode of the facial-tracking sensor, and determining a capacitance value of the sense capacitor electrode of the facial-tracking sensor based upon an amount of charge accumulated on the sense capacitor electrode of the facial-tracking sensor resulting from applying the reference voltage. In some such examples, the method alternatively or additionally comprises applying the reference voltage to a shielding track along an electrical connection between the facial-tracking sensor and the charge sensing circuit. In some such examples, determining the capacitance value of the sense capacitor electrode alternatively or additionally comprises determining a plurality of capacitance bit values based at least on oversampling the amount of charge accumulated on the sense capacitor electrode of the facial-tracking sensor. In some such examples, the method alternatively or additionally comprises filtering high-frequency noise from the plurality of capacitance bit values. In some such examples, the method alternatively or additionally comprises cancelling an offset capacitance on the sense capacitor electrode by discharging the offset capacitance via toggling a connection of an offset-compensating capacitor.

Another example provides a head-mounted device, comprising, a plurality of facial-tracking sensors, each facial-tracking sensor of the plurality of facial-tracking sensors comprising a sense capacitor electrode configured to be positioned proximate to a surface of a face, a controller configured to concurrently apply a reference voltage to the sense capacitor electrodes of the plurality of facial-tracking sensors, and a corresponding plurality of charge sensing circuits, each charge sensing circuit of the corresponding plurality of charge sensing circuits connected to a corresponding facial-tracking sensor. In some such examples, each charge sensing circuit of the corresponding plurality of charge sensing circuit alternatively or additionally is configured to determine a capacitance of the sense capacitor electrode of the corresponding facial-tracking sensor by determining an amount of charge accumulated on the sense capacitor electrode of the corresponding facial-tracking sensor resulting from the reference voltage. In some such examples, each charge sensing circuit of the plurality of charge sensing circuits is alternatively or additionally configured to output a plurality of capacitance bit values based at least on oversampling the amount of charge accumulated on the sense capacitor electrode of the corresponding facial-tracking sensor. In some such examples, each charge sensing circuit of the plurality charge sensing circuits is alternatively or additionally configured to filter high-frequency noise from the plurality of capacitance bit values. In some such examples, the controller is alternatively or additionally configured to concurrently operate the corresponding plurality of charge sensing circuits. In some such examples, the device alternatively or additionally comprises a shielding track along electrical connections between the plurality of facial-tracking sensors and the corresponding plurality of charge sensing circuits, and the controller is alternatively or additionally configured to apply the reference voltage to the shielding track. In some such examples, the device alternatively or additionally comprises a corresponding plurality of offset-compensating capacitors connected to the corresponding plurality of facial-tracking sensors, and the controller is alternatively or additionally configured, for each offset-compensating capacitor of the corresponding plurality of offset-compensating capacitors, to toggle a connection of the offset-compensating capacitor to electrically cancel an offset capacitance on the sense capacitor electrode of the corresponding facial-tracking sensor.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted device, comprising:
a facial-tracking sensor comprising a sense capacitor electrode configured to be positioned proximate to a surface of a face and form a capacitance based upon a distance between the sense capacitor electrode and the surface of the face;
a controller configured to apply a reference voltage to the sense capacitor electrode, resulting in charge accumulating on the sense capacitor electrode in relation to the capacitance formed on the sense capacitor electrode; and
a charge sensing circuit comprising an integrator having a first input and a second input controllably connected to the sense capacitor electrode of the facial-tracking sensor, the charge sensing circuit being configured to determine an amount of the charge accumulated on the sense capacitor electrode, and to determine the capacitance of the sense capacitor electrode based upon the amount of the charge accumulated and the reference voltage.

2. The device of claim 1, further comprising a shielding track along an electrical connection between the charge sensing circuit and the facial-tracking sensor, and wherein the controller is further configured to apply the reference voltage to the shielding track.

3. The device of claim 1, wherein the charge sensing circuit is further configured to generate a plurality of capacitance bit values based at least on oversampling the amount of the charge accumulated.

4. The device of claim 3, wherein the charge sensing circuit is further configured to filter high-frequency noise from the plurality of capacitance bit values.

5. The device of claim 3, wherein the integrator of the charge sensing circuit is within a sigma-delta analog-digital converter and the charge sensing circuit further comprises a digital filter connected to an output of the sigma-delta analog-digital converter.

6. The device of claim 1, further comprising an offset-compensating capacitor.

7. The device of claim 6, wherein the offset-compensating capacitor comprises a programmable capacitor.

8. The device of claim 7, wherein
the facial-tracking sensor is a first facial-tracking sensor,
the charge sensing circuit is a first charge sensing circuit,
the device further comprises a second facial-tracking sensor and a second charge sensing circuit connected to the second facial-tracking sensor, and
the controller is further configured to concurrently apply the reference voltage to the sense capacitor electrode of the first facial-tracking sensor and a sense capacitor electrode of the second facial-tracking sensor, and concurrently operate the first charge sensing circuit and the second charge sensing circuit.

9. On a head-mounted device comprising a facial-tracking sensor and a charge sensing circuit including an integrator, a method comprising:
applying a reference voltage to a sense capacitor electrode of the facial-tracking sensor to accumulate charge on the sense capacitor electrode in relation to a capacitance formed on the sense capacitor electrode; and
controlling a first input and a second input of the integrator to selectively conduct to the integrator the charge accumulated on the sense capacitor electrode of the facial-tracking sensor to determine a capacitance value of the sense capacitor electrode of the facial-tracking sensor based upon an amount of the charge accumulated on the sense capacitor electrode and the reference voltage.

10. The method of claim 9, further comprising applying the reference voltage to a shielding track along an electrical connection between the facial-tracking sensor and the charge sensing circuit.

11. The method of claim 9, wherein determining the capacitance value of the sense capacitor electrode comprises determining a plurality of capacitance bit values based at least on oversampling the amount of the charge accumulated on the sense capacitor electrode of the facial-tracking sensor.

12. The method of claim 11, further comprising filtering high-frequency noise from the plurality of capacitance bit values.

13. The method of claim 9, further comprising cancelling an offset capacitance on the sense capacitor electrode by discharging the offset capacitance via an offset-compensating capacitor.

14. A head-mounted device, comprising:
a plurality of facial-tracking sensors, each facial-tracking sensor of the plurality of facial-tracking sensors comprising a sense capacitor electrode configured to be positioned proximate to a surface of a face;
a controller configured to concurrently apply a reference voltage to the sense capacitor electrodes of the plurality of facial-tracking sensors, resulting in charge accumulating on the sense capacitor electrodes in relation to respective capacitance formed on the sense capacitor electrodes; and
a corresponding plurality of charge sensing circuits, each charge sensing circuit of the corresponding plurality of charge sensing circuits comprising an integrator having a first input and a second input controllably connected to the sense capacitor electrode of a corresponding facial-tracking sensor.

15. The device of claim 14, wherein each charge sensing circuit of the corresponding plurality of charge sensing circuit is configured to determine a capacitance of the sense capacitor electrode of the corresponding facial-tracking sensor based at least upon an amount of the charge accumulated on the sense capacitor electrode of the corresponding facial-tracking sensor and the reference voltage.

16. The device of claim 15, wherein each charge sensing circuit of the plurality of charge sensing circuits is further configured to output a plurality of capacitance bit values based at least on oversampling the amount of the charge accumulated on the sense capacitor electrode of the corresponding facial-tracking sensor.

17. The device of claim 16, wherein each charge sensing circuit of the plurality charge sensing circuits is further configured to filter high-frequency noise from the plurality of capacitance bit values.

18. The device of claim 14, wherein the controller is further configured to concurrently operate the corresponding plurality of charge sensing circuits.

19. The device of claim 14, further comprising a shielding track along electrical connections between the plurality of facial-tracking sensors and the corresponding plurality of charge sensing circuits, and wherein the controller is further configured to apply the reference voltage to the shielding track.

20. The device of claim 14, further comprising a corresponding plurality of offset-compensating capacitors.

* * * * *